March 25, 1969     C. H. BARR, SR., ET AL     3,434,468
BLOOD SAMPLING DEVICE WITH CANNULA HOLDER
Original Filed Nov. 28, 1962
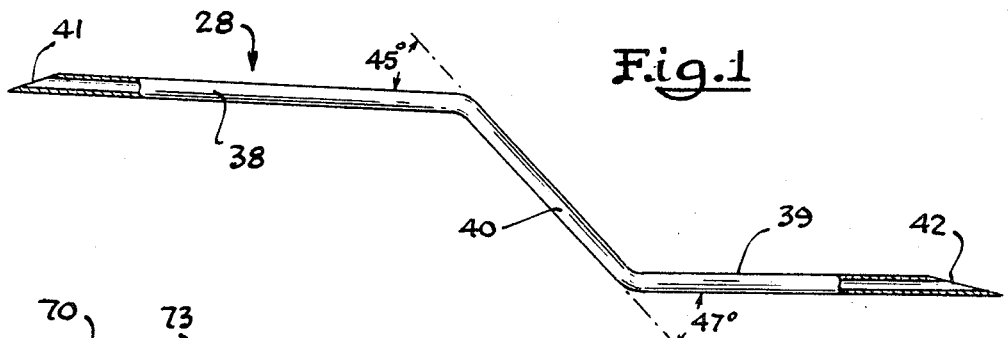
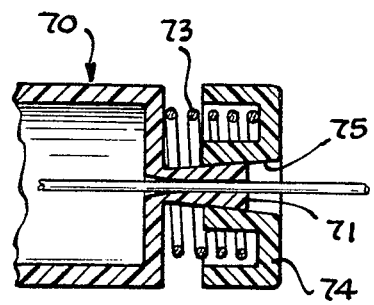
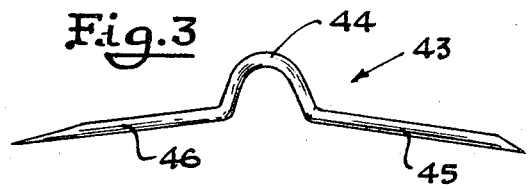
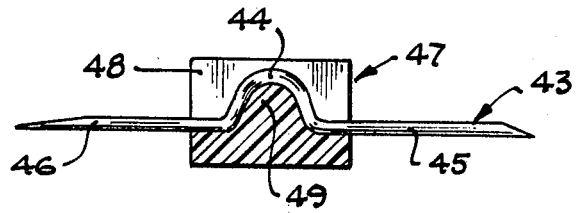
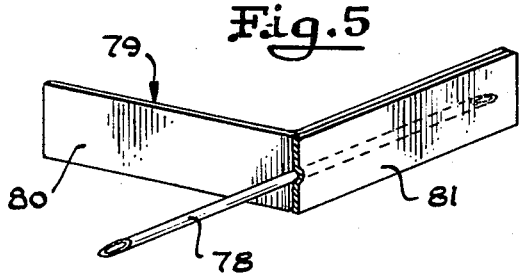
INVENTORS
COURTLAND H. BARR, SR.
COURTLAND H. BARR, JR.
JOHN W. BARR
JAMES W. LUCAS
BY
ATTORNEY

United States Patent Office 3,434,468
Patented Mar. 25, 1969

3,434,468
BLOOD SAMPLING DEVICE WITH
CANNULA HOLDER
Courtland H. Barr, Sr., Los Angeles, Courtland H. Barr, Jr., La Canada, John W. Barr, Glendale, and James W. Lucas, Los Angeles, Calif., assignors, by mesne assignments, to Abbott Laboratories, North Chicago, Ill., a corporation of Illinois
Original application Nov. 28, 1962, Ser. No. 240,553. Divided and this application Feb. 10, 1966, Ser. No. 526,529
Int. Cl. A61b 5/10; A61m 5/00
U.S. Cl. 128—2                                                          5 Claims

ABSTRACT OF THE DISCLOSURE

A cannula holder comprising a tubular body with an end wall having a tapered projection extending therefrom, the small end of the projection being adjacent the wall and a spring urged compression member with a tapered passage arranged to exert pressure on the projection whereby a cannula is retained in the holder.

---

This application is a division of Ser. No. 240,553, filed Nov. 28, 1962, now abandoned.

This invention relates to apparatus for the collection of blood samples and has particular reference to improved apparatus used in drawing or otherwise collecting blood from veins. More particularly, the present invention relates to a blood sampling device in which the cannula is mounted such that it is firmly held in its mounting but is capable of being easily removed. The present invention also relates to such a device in which the cannula is automatically indexed and oriented.

Conventional practices in the collection of blood samples from live subjects include the use of an evacuated tube or vial closed at one end by a stopper of rubber or other resilient material adapted to be pierced by a cannula or hollow needle which is either directly or indirectly in communication with a vein of the patient. The stopper is generally formed with an inner axial recess extended partially from the lower end thereof and, in many cases, a similar recess extends downwardly from the top of the stopper. In either event, a diaphragm is thus formed in the stopper, the primary purpose of the diaphragm being to present a reduced thickness portion permitting ready insertion of the needle therethrough. A more recently developed stopper has a planar upper end and a recess extending upwardly from the bottom of the stopper.

In such prior art devices, the cannula is mounted in a holder in such a manner that the cannula may be caused to puncture the stopper by moving the holder. In such devices, the cannula may be mounted directly on the holder or may be mounted in a hub which, in turn, is mounted on the holder. In either case, the cannula is firmly attached to its mounting by well known means such as gluing, swedging, friction fitting, flaring, wedging or the like. Where a hub is used, the hub may be attached to the holder by a Luer lock, friction fit or a threaded connection.

Although such devices have gained reasonable acceptance, they are subject to many deficiencies. Among these deficiencies are the impossibility or great difficulty in removing the cannula from its mounting, the great amount of care that must be taken in mounting the cannula such that sufficient length is present on each side of the mounting to both pierce the stopper and to pierce the vein of the subject, and the near impossibility of consistently orienting the cannula in its mounting such that the bevel in the end thereof which is to be inserted in the subject is in the proper position when the blood sampling assembly is held in the normal manner. Furthermore, none of the prior art devices permit removal of the cannula from the holder without touching the cannula or hub. This is a particularly serious disadvantage since many aliments, such as hepatitis, may be contracted simply by contact with the blood which remains on the cannula after it is withdrawn from the subject.

The present invention is not subject to these disadvantages and has many additional advantages.

It is an object of the present invention to provide a blood sampling assembly in which the cannula is firmly held in a holder, but which permits easy and rapid mounting and removal of the cannula without touching the cannula.

Another object of the present invention is to provide a blood sampling assembly in which the cannula is automatically indexed such that it presents sufficient length both for insertion into the subject and for puncturing of the stopper.

It is a further object of the present invention to provide a blood sampling assembly in which the bevel in the needle end which is to be inserted into the patient is automatically oriented with respect to the holder.

It is another object of this invention to provide a blood sampling assembly in which there is no necessity to provide the cannula with a hub.

Still another object of the present invention is to provide a blood sampling assembly in which a longitudinal portion of the cannula is substantially coplanar with a longitudinal wall of the holder.

Other objects and advantages of the present invention will be readily apparent from the following detailed description of preferred embodiments thereof when read in connection with the accompanying drawings.

Briefly, the present invention comprises a blood sampling assembly in which a cannula is firmly held in a mounting but is easily removable therefrom. A preferred embodiment of the present invention comprises a cannula which is other than straight and a mounting means having a configuration which generally corresponds to that of the cannula. In a preferred embodiment of the present invention, the cannula is held in its mounting by a slidable member. In a preferred embodiment of the present invention, the cannula is so mounted in the holder and a stoppered blood collection vial is slidably mounted in the holder. The cannula of the present invention may have a variety of configurations which are other than straight. For example, the cannula may consist of two parallel portions connected by a diagonal intermediate portion, or the cannula may simply be provided with a U-bend in an intermediate portion thereof, or it may have virtually any other configuration which is other than straight. The preferred embodiment of the present invention comprises a cannula which has two portions located in different planes which are connected by a diagonal intermediate portion. This intermediate portion may be slightly bowed in order to provide a spring effect.

In the drawings:

FIGURE 1 is a side view of the cannula adapted for use with the holder illustrated in FIGURE 2.

FIGURE 2 is a sectioned view of the holder of the present invention.

FIGURE 3 is a side view of an alternate type of cannula which may be used in the practice of the present invention.

FIGURE 4 is a sectional view of the cannula of FIGURE 3 supported by a suitable mounting.

FIGURE 5 illustrates a package which will serve to index a cannula.

Referring now to the drawings, FIGURE 1 illustrates the cannula which is used with the structure illustrated in FIGURE 2. This cannula, which is indicated generally by numeral 28, comprises two substantially parallel portions 38 and 39, which are connected by diagonal intermediate portion 40. In the preferred embodiment of the present invention, intermediate portion 40 is slightly bowed and portion 38 meets portion 40 at an angle of 45° while portion 39 meets portion 40 at an angle of 47°. Preferably, portions 38, 39 and 40 are in the same vertical plane as illustrated in FIGURE 1. Preferably, each of the ends of cannula 28 are provided with bevels 41 and 42. In this preferred embodiment, bevel 41, which is designed to puncture the stopper has a bevel angle of approximately 23° while bevel 42 which is designed for insertion into the patient has a bevel angle of approximately 10°. Furthermore, bevel 42 is oriented with respect to diagonal portion 40 such that, when the cannula has been assembled in the holder, the bevel 42 will be presented at the proper angle to the vein of the subject when the assembly is held in the normal manner.

FIGURE 2 illustrates an embodiment of the present invention in which the holder indicated generally by numeral 70 is provided with mounting 71 which has a tapered outer surface and an aperture therethrough. Mounting 71 may comprise a plurality of flexible fingers or any other compressible material. Holder 70 is also provided with a locking means comprising spring 73 and locking member 74. Spring 73 is adapted to urge locking member 74 away from holder 70. Locking member 74 is also provided with tapered aperture 75. Thus, to assemble a cannula in this device, locking member 74 is urged toward holder 70 and a cannula is inserted through the aperture in mounting 71. Locking member 74 is then released and spring 73 urges tapered aperture 75 against mounting 71 to firmly grip the cannula in the mounting. To remove the cannula, the locking member 74 is simply urged toward holder 70. It will be apparent that aperture 75 may have a circular cross section or may be a transverse slot. In the latter case, spring 73 operates to hold elements 70 and 74 in the assembled position as illustrated. Furthermore, holder 70 and cover member 74 may be provided with protrusions which will serve as mountings for spring 73.

It will be obvious to those skilled in the art that a plurality of functions are performed by the assembly previously described. Not only is the cannula firmly gripped by the holder and slide element, but the cannula is also indexed such that precisely the right length extends inwardly into the holder and operates efficiently to puncture the stopper while precisely the correct length is presented for insertion into the patient and the bevel is in precisely the correct orientation for insertion in the patient.

Referring now to FIGURES 3 and 4, another cannula useful in the present invention is shown. In this embodiment, the cannula 43 has a U-bend 44 in an intermediate portion thereof. End portions 45 and 46 may be parallel, but preferably are inclined at an angle such that they will exert a spring force as will hereinafter be explained. It is to be understood that bend 44 need only be generally U-shaped, i.e., this bend could be V-shaped or have perpendicular or angular corners.

A suitable mounting for cannula 43 is illustrated in FIGURE 4. This mounting would, of course, be preferably integrally united with a holder such as illustrated in FIGURE 2. This mounting which is indicated generally by numeral 47 is preferably a longitudinal member having a groove 48 therein. At an intermediate point along the length of groove 48, a protrusion 49 is formed. As illustrated in FIGURE 4, the U-shaped bend 44 in cannula 43 corresponds generally to protrusion 49. Preferably, protrusion 49 is formed such that it is slightly larger than U-shaped bend 44 when the bend is relaxed such that bend 44 will exert compressive forces on protrusion 49 when cannula 43 and mounting 47 are assembled. If, as illustrated in FIGURE 3, end portions 45 and 46 of cannula 43 are formed such that they are not parallel, they will exert a spring force which will enhance the grip of mounting 47 on cannula 43. It is apparent that protrusion 49 may extend upwardly or downwardly, as desired.

It is obvious that the cannula need not have the configuration specifically described herein. For example, the cannula could simply be crimped or pinched to form an enlarged portion or a constriction could be formed in the cannula to give it an hour glass shape or the cannula could comprise two telescoped members thereby forming a circumferential ridge in an intermediate portion thereof. This embodiment is ideally suited for the use of a composite cannula, e.g., a cannula in which the arm insertion end comprises metal and the stopper puncturing end comprises a plastic. Such a cannula may be used with the holder illustrated in FIGURE 2.

It is to be emphasized that the present invention is not limited to cannulas which are other than straight (although it is believed that cannulas which are other than straight are an inventive improvement over straight cannulas) and that blood sampling devices comprising a straight cannula which is firmly held in a holder but which is easily removable are within the scope of the present invention.

FIGURE 5 illustrates a package comprising a cannula 78 and a container illustrated generally by numeral 79. Container 79 is formed such that portion 80 may be disengaged from cannula 78 without disengaging portion 81. This package will thus serve as a means for automatically indexing straight cannulas and may, for example, be used in conjunction with the embodiment of the present invention illustrated in FIGURE 2. Predetermined orientation may also be achieved by pre-embedding the cannula in a stopper to desired degree.

It will be obvious to those skilled in the art that the structure of the present invention may be made from any suitable materials, e.g., plastic, metal, glass, etc., without adversely affecting the operation thereof. Also, it will be understood to those skilled in the art that while the improvements constituting the present invention have been described in connection with a blood sampling assembly, the use thereof is not inherently so limited and these improvements may be incorporated in other structures such as, for example, disposable assemblies for administering injectables. Furthermore, although the present invention is particularly useful in conjunction with evacuated or pressurized vials, it is not limited to use with such vials and may be used with syringe-type and other types of apparatus.

Having fully described our invention, it is to be understood that we do not wish to be limited to the details set forth, but our invention is of the full scope of the appended claims.

We claim:
1. A cannula mount for releasably retaining in place a cannula of substantially uniform diameter from end to end comprising a substantially tubular body having an end wall; a projection extending outwardly from said end wall, said projection having a tapered width with the smaller end of said tapered width adjacent to said end wall; said projection and end wall having a continuous passage passing therethrough, said projection being fabricated from resilient material such that the diameter of said passage may be reduced by the exertion of compressive forces on the external surface of said projection; a compression means, said compression means comprising a discoid member having a sleeve projecting therefrom, the internal surface of said sleeve comprising a tapered passage which has a minimum width which is smaller than the maximum width of said tapered projection; and a resilient member positioned between said end wall and said discoid member whereby said compression means is urged away from said end wall and said sleeve is caused to exert compressive forces on said tapered projection.

2. A cannula mount for releasably retaining in place a cannula of substantially uniform diameter from end to end comprising a substantially tubular body having an end wall; a projection extending outwardly from said end wall, said projection having the shape of a truncated cone with the smaller end of said cone adjacent to said end wall; said projection and end wall having a continuous passage passing therethrough, said projection being fabricated from resilient material such that the diameter of said passage may be reduced by the exertion of compressive forces on the external surface of said projection; a compression means, said compression means comprising a discoid member having a sleeve projecting therefrom, the internal surface of said sleeve comprising a tapered passage which has a minimum diameter which is smaller than the maximum diameter of said conical projection; and a resilient member positioned between said end wall and said discoid member whereby said compression means is urged away from said end wall and said sleeve is caused to exert compressive forces on said conical projection.

3. The cannula mount of claim 2 wherein the resilient member is a spring.

4. A blood sampling assembly comprising a cannula having a substantially uniform diameter from end to end and a cannula mount for releasably retaining in place a cannula and comprising a substantially tubular body having an end wall, a projection extending outwardly from said end wall, said projection having a shape of a truncated cone with a smaller end of said cone adjacent to said end wall; said projection and end wall having a continuous passage passing therethrough, said projection being fabricated from resilient material such that the diameter of said passage may be reduced by the exertion of compressive forces on the external surface of said projection; a compression means, said compression means comprising a discoid member having a sleeve projecting therefrom the internal surface of said sleeve comprising a tapered passage which has a minimum diameter which is smaller than the maximum diameter of said conical projection; and a resilient member positioned between said end wall and said discoid member whereby said compression means is urged away from said end wall and said sleeve is caused to exert compressive forces on said conical member to thereby retain said cannula in place.

5. The assembly of claim 4 wherein the resilient member is a spring.

References Cited

UNITED STATES PATENTS

| 1,526,824 | 2/1925 | Bock | 128—221 |
| 1,683,350 | 9/1928 | Hein | 128—221 |
| 2,147,616 | 2/1939 | Chaput. | |
| 2,577,556 | 12/1951 | Williams. | |
| 2,855,927 | 10/1958 | Henderson. | |
| 3,052,241 | 9/1962 | Myerson et al. | 128—221 |
| 3,063,450 | 11/1962 | Myerson et al. | |
| 3,276,632 | 10/1966 | Stanzel | 128—221 |

FOREIGN PATENTS

| 403,397 | 8/1924 | Germany. |
| 1,000,708 | 10/1951 | France. |
| 1,084,286 | 7/1954 | France. |
| 1,168,505 | 9/1958 | France. |

RICHARD A. GAUDET, *Primary Examiner.*

MARTIN F. MAJESTIC, *Assistant Examiner.*

U.S. Cl. X.R.

128—221; 279—50